Figure 1:
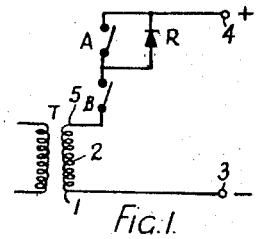

Oct. 24, 1944. S. A. STEVENS ET AL 2,361,155
MECHANICAL RECTIFIER OR CONVERTER FOR ALTERNATING ELECTRIC CURRENTS
Filed July 15, 1943 2 Sheets-Sheet 2

INVENTORS
Sydney Arthur Stevens &
Alec Hervey Bennett Walker
BY
THEIR ATTORNEY

Patented Oct. 24, 1944

2,361,155

UNITED STATES PATENT OFFICE 2,361,155

MECHANICAL RECTIFIER OR CONVERTER FOR ALTERNATING ELECTRIC CURRENTS

Sydney Arthur Stevens and Alec Hervey Bennett Walker, London, England, assignors, by mesne assignments, to The Union Switch and Signal Company, Swissvale, Pa., a corporation of Pennsylvania Application July 15, 1943, Serial No. 494,812
In Great Britain March 18, 1942

3 Claims. (Cl. 175—364)

This invention relates to mechanical rectifiers or converters for alternating electric currents of the kind comprising contact mechanism arranged to be synchronously operated coresponding to the alternating current frequency involved so as to effect the necessary commutations or reversals of connections between the alternating and direct current circuits.

The invention is more particularly applicable to apparatus of this character for the rectification of alternating currents and has for its object to improve the efficiency and to reduce the cost and bulk of the apparatus.

Mechanical rectifiers for this purpose have previously been proposed but are open to the serious disadvantages that the necessary commutation or reversals of connections between the alternating and direct current circuits must be effected at or very near the instants at which the alternating current wave passes through zero as otherwise considerable arcing or sparking occurs resulting in rapid deterioration or destruction of the mechanically operated contacts.

According to the principal feature of the invention asymmetric current carrying devices or rectifiers preferably of the dry surface contact type are associated with the contact mechanism in such a manner that the circuit between the alternating and direct current circuits includes the asymmetric devices or rectifiers at and during the period of commutation, the current in the circuit at this time being thereby reduced to a very low value after the alternating current wave has passed its zero since this current then traverses the devices in their reverse direction and the circuit can thus be interrupted without appreciable arcing or sparking.

The asymmetric devices or rectifiers may be arranged to be traversed by the current for a short interval prior to the alternating current wave passing through zero so that during the whole period of commutation but only during this period the total current traverses the devices or rectifiers and the voltages and currents involved during this period being comparatively low the necessary opening and closing of the mechanically operated contacts can be effected without disadvantage. During the remainder and greater part of the alternating current wave the current between the alternating and direct current input and output circuits traverses the closed mechanically operated contacts and the asymmetric devices or rectifiers being substantially inoperative during these periods may be relatively small both as regards current carrying capacity and ability to withstand applied voltage in the reverse direction.

Figure 8:
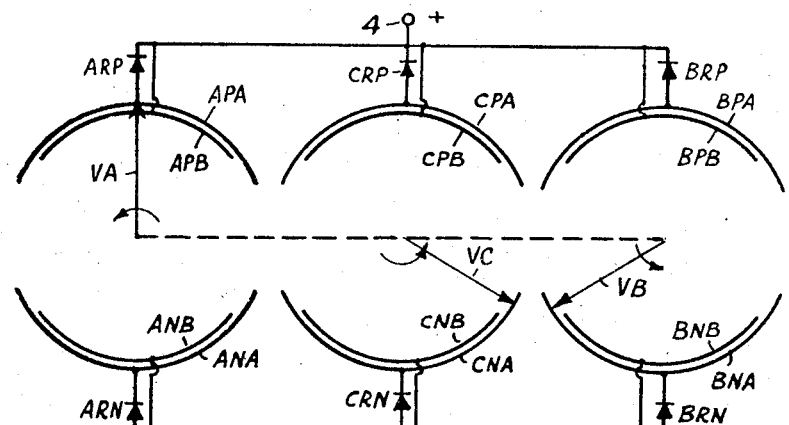
Figure 9:
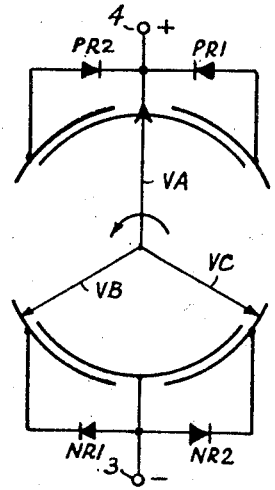
Figure 10:
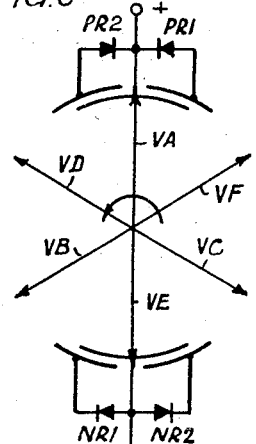

The invention is illustrated by way of example in the accompanying drawings of which Figures 1, 2, 3, 4, 5, 6 and 7 are diagrammatic views of rectifier or converter systems embodying various forms of the invention, Figures 8, 9 and 10 being charts illustrating the timing of the various contacts employed in certain of these forms.

Referring now to Figure 1 illustrating the invention as applied to the half-way rectification of single phase alternating current it will be seen that one terminal 1 of the alternating current source (here shown as the secondary winding 2 of a transformer T) is connected to the negative terminal 3 of the direct current circuit, the other or positive terminal 4 of which is connected to the other terminal 5 of the source through two mechanically operated contacts A and B connected in series with one another, a metal rectifier R being connected in parallel with the contact A in such a manner that its forward direction of flow of current is towards the positive direct current terminal 4. During the positive half-wave of the alternating current the contact B remains closed and during the first part of the cycle (until shortly after the wave has passed its zero) the contact A is open so that the relatively small current traverses the contact B and the rectifier R in series with one another. The contact A then closes so as to short-circuit the rectifier R and the current during the greater part of the positive half-wave thus passes through the contacts B and A in series. Towards the end of the half-wave shortly before the wave passes again through its zero, the contact A opens and the current passes through the contact B and the rectifier R in series. At the beginning of the negative half-wave the current traverses the rectifier R in its reverse direction and is thus of very low value so that when the contact B is opened there is practically no sparking. The contact B remains open during the greater part of the negative half-wave but is closed again as the wave approaches zero.

This cycle of operation of the contacts A and B is continuously repeated and it will be seen that half-wave (the positive half-wave) rectification is obtained and that the contacts are never required to be opened or closed under any considerable current while the rectifier is never subjected to more than a relatively small fraction of the peak voltage of the alternating current wave.

Figure 2:
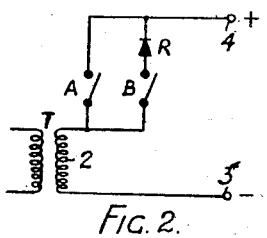

In order to avoid the circuit of the rectifier current including the contacts A and B in series the modified connection shown in Figure 2 may be utilised in which these contacts are in parallel, the rectifier R being connected in series with the contact B.

Either of these arrangements may be also applied so that full wave rectification is obtained. Systems of this kind corresponding respectively to the half-wave systems of Figures 1 and 2 are illustrated in Figures 3 and 4 from which it will be seen that the terminal 5 of the secondary winding 2 of the transformer T is connected through contacts AP and BP and a rectifier RP to the positive terminal 4 of the direct current circuit while the terminal 1, of the winding 2 is connected to the terminal 4 through contacts AN and SN and a rectifier RN, the negative terminal 3 of the direct current circuit being connected to the middle point 6 of the secondary winding 2 of the transformer T.

Figure 3:
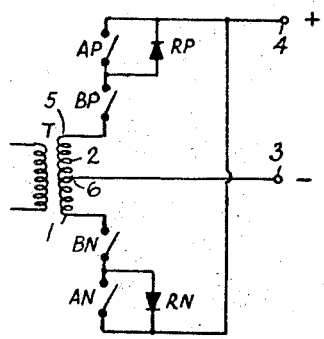
Figure 4:
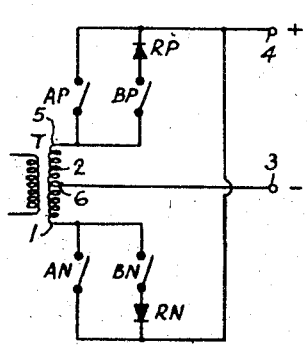

It will be evident that in the systems of Figures 3 and 4 the contacts and a rectifier is applied to each phase of a bi-phase alternating current source (the two phases being 180° displaced in phase) more usually termed a single phase system.

Figure 5:
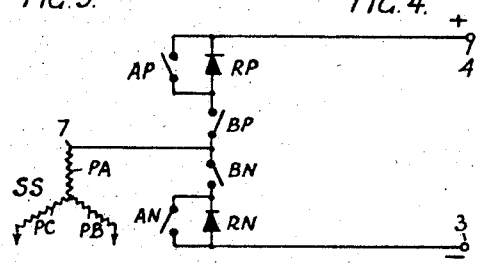
Figure 6:
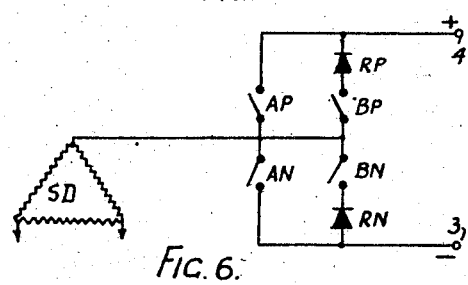

By a similar further development the systems of contacts and a rectifier shown in Figures 1 and 2 may be applied to each single phase of a three-phase alternating current source six rectifiers and twelve contacts in all being thus required as shown in Figures 5 and 6.

Referring to Figure 5 it will be seen that the terminal 7 of one phase winding PA of a star-connected three-phase alternating current source SS is connected through contacts AP, BP and a rectifier RP to the positive terminal 4 of the direct current circuit and through contacts BN and AN and a rectifier RN to the negative terminal 3. A similar system of contacts and rectifier is provided for each of the other phase windings PB and PC of the source SS.

In the system of Figure 6, each phase terminal of a delta-connected source SD is connected to the terminals 4, 3 of the direct current circuit through contacts AP, BP, AN, BN and rectifiers RP and RN as shown in the figure in the case of one phase of the source.

The operation of the system of Figure 6 will be more clearly understood from the timing chart shown in Figure 8 in which the voltage phase relations of the three phases of the source of supply correspond to vectors VA, VB, VC represented as rotating contact arms adapted to engage with fixed positive contact arcs APA, APB and fixed negative contact arcs ANA, ANB for phase A corresponding contact arcs BPA, BPB, BNA, BNB and CPA, CPB, CNA, CNB being shown for the other two phases.

It will be understood that the circumferential lengths of the contact arcs correspond to the time durations of the various connections effected by the rotating contact arms and it will be seen that the rectifier ARP for example is included in the circuit leading to the positive terminal of the direct current circuit (for a period corresponding to the contact arc APA) from a phase position earlier than the beginning of the positive alternation of the A phase up to beyond the end of this alternation, the rectifier ARP being however short-circuited during the period represented by the contact arc APB, that is, a period from a phase position later than the beginning of the alternation to a phase position earlier than the end of this positive alternation.

The same conditions apply to the contact arcs and rectifiers BRP, BRN and CRB, CRN of the other two phases and Figure 8 thus illustrates the timing of the contact openings and closings referred to in connection with Figure 6.

Figure 7:
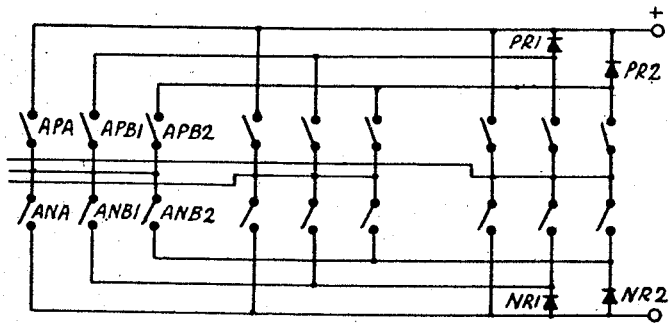

Referring now to Figure 7 a modified three-phase system is illustrated in which only four rectifiers PR1, PR2 and NR1, NR2 are required with six contacts for each phase indicated at APA, ANA, APB1, ANB1, APB2 and ANB2 in the case of phase A, similar contacts being provided for the other two phases.

The rectifiers PR1 and NR1 may be termed "lead" rectifiers and the rectifiers PR2 and NR2 may be termed "lag" rectifiers, the sets of rectifiers PR1, PR2 and NR1, NR2 serve for each phase in turn during the period of commutation, the first set being included in circuit by the action of the contacts at the beginning and end of the positive alternation and the second rectifier set being similarly rendered operative for the negative alternation.

Figure 9 is the corresponding timing chart for the system of Figure 7 and comprises rotating arms and fixed contacts the action of which will be evident without further explanation.

The same principle may evidently be applied to a six-phase source of alternating current as shown in the timing chart of Figure 10 which comprises six rotating contact arms VA to VF inclusive, adapted to engage with corresponding fixed, contact arcs as shown, a total of only four rectifiers being required, with six contacts for each phase.

The form of the invention shown in Figures 7 and 9 may evidently be applied to other multi-phase systems in a similar manner.

The contacts above referred to may be of any desired type, operated for example by rocking or tilting mechanism or a rotating commutator and brush construction may be employed. Preferably, however, the contacts are of the butt type arranged to be operated by cams on a rotor driven by a small synchronous motor.

By reversal of the polarities of the rectifiers the invention may evidently also be applied to inverters for the conversion of direct current into alternating current and is by no means limited to the particular arrangements and systems of connections above described and illustrated by way of example.

Having now particularly described and ascertained the nature of our said invention and in what manner the same is to be performed, we declare that what we claim is:

1. Means for converting alternating current into unidirectional current comprising, in combination with the alternating current source, a first and a second contact pair connected in series between a terminal of said source and one terminal of the unidirectional current output and operating synchronously with respect to the frequency of said source, said first contact pair becoming closed when the alternating current wave is at or near its zero value and becoming open approximately one-half cycle later, said second contact pair becoming closed a short interval of time after said first contact pair closes and becoming open a short interval of time before said first contact pair opens, and an asymmetric unit connected across said second contact pair for reducing the current passing through said first contact pair during the commutation period.

2. Means for converting alternating current into unidirectional current comprising, in combination with the alternating current source, a first and a second contact pair operating synchronously with respect to the frequency of said source, and an asymmetric unit connected in series with said first contact pair between a terminal of said source and one terminal of the unidirectional current output, said second contact pair being connected in multiple with the combination of said first contact pair and said asymmetric unit, said first contact pair becoming closed when the alternating current wave is at or near its zero value and becoming open approximately one-half cycle later, said second contact pair becoming closed a short interval of time after said first contact pair closes and becoming open a short interval of time before said first contact pair opens, whereby the current passing through said first contact pair is reduced by said asymmetric unit during the commutation period.

3. Commutating apparatus for synchronous converters and inverters comprising, a first and a second contact pair operating synchronously with respect to the frequency of the alternating current, and an asymmetric unit connected in series with said first contact pair in a circuit path between an alternating and a unidirectional terminal of the apparatus, said second contact pair operating when closed to shunt said asymmetric unit, said first contact pair becoming closed when the alternating current wave is at or near its zero value and becoming open approximately one-half cycle later, said second contact pair becoming closed a short interval of time after said first contact pair closes and becoming open a short interval of time before said first contact pair opens, whereby the current passing through said first contact pair is reduced by said asymmetric unit during the commutation period.

SYDNEY ARTHUR STEVENS.
ALEC HERVEY BENNETT WALKER.